United States Patent [19]

Wang

[11] Patent Number: 5,008,577

[45] Date of Patent: Apr. 16, 1991

[54] ASSEMBLED COMMUTATOR WITH HEAT-RESISTING RING

[75] Inventor: Patrick S. Wang, Repulse Bay, Hong Kong

[73] Assignee: Johnson Electric S.A., La Chaux de Fonds, Switzerland

[21] Appl. No.: 418,021

[22] Filed: Oct. 10, 1989

[30] Foreign Application Priority Data

Oct. 13, 1988 [GB] United Kingdom ................ 8823991
Oct. 13, 1988 [GB] United Kingdom ................ 8823992

[51] Int. Cl.$^5$ ................... H02K 13/04; H01R 39/16; H01R 39/32
[52] U.S. Cl. ................... 310/233; 310/235; 310/234; 310/236; 310/43
[58] Field of Search ............... 310/68 R, 72, 220, 221, 310/222, 231, 233, 234, 235, 236, 43

[56] References Cited

U.S. PATENT DOCUMENTS 4,734,607  3/1988  Ikawa et al. ................ 310/233
4,833,357  5/1989  Tamura et al. ................ 310/221

FOREIGN PATENT DOCUMENTS 1089868   9/1960  Fed. Rep. of Germany ...... 310/220
0035947   2/1985  Japan ................ 310/233
0157246   7/1986  Japan ................ 310/233
0080736   4/1988  Japan ................ 310/233
1547093   6/1979  United Kingdom ........ 310/221
2177854   1/1987  United Kingdom ........ 310/220
2203291A 10/1988  United Kingdom .

Primary Examiner—R. Skudy
Assistant Examiner—C. LaBalle
Attorney, Agent, or Firm—Fleit, Jacobson, Cohn, Price, Holman & Stern

[57] ABSTRACT

An assembled commutator has a thermoplastics base supporting segments. A ring 15 of high temperature, non-softening material, such as phenolic, fits on a shelf on the base beneath tangs which are for hot connection, particularly forging, to an armature wire. The ring is held in place by fingers on the tangs.

4 Claims, 1 Drawing Sheet

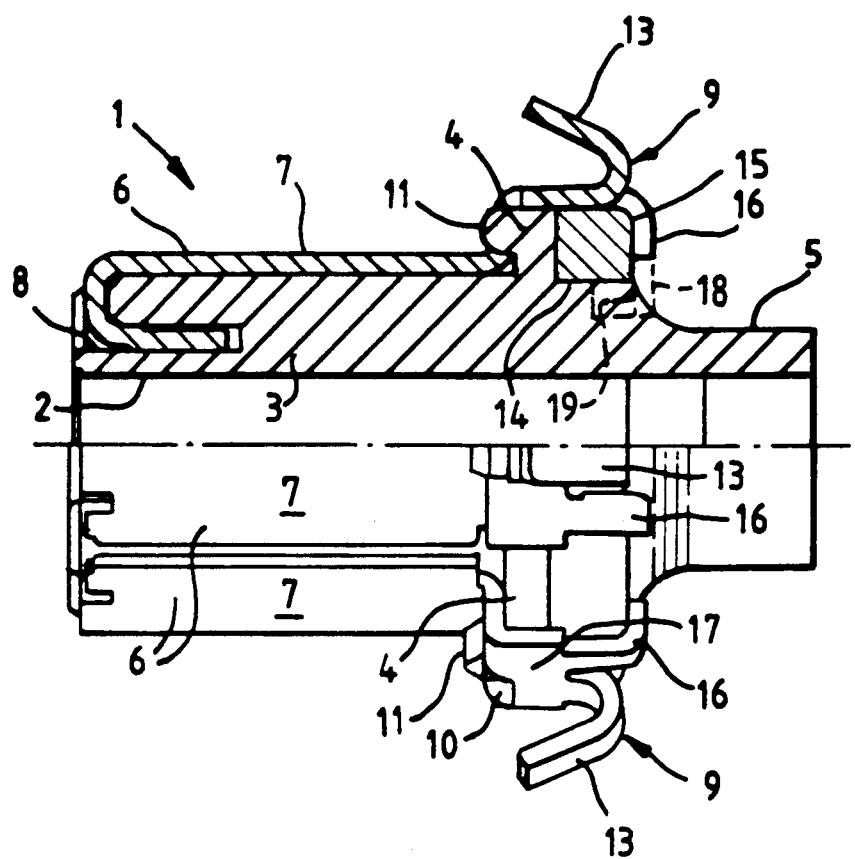

ASSEMBLED COMMUTATOR WITH HEAT-RESISTING RING

The present invention relates to an assembled commutator in which the segments have tangs arranged to be connected to an armature winding wire by a hot connection, such as forging or soldering.

BACKGROUND TO THE INVENTION

When forging a connection between the segment tang and armature wire, both heat and pressure are applied to the tang. This can result in distortion of the commutator base beneath the tang. If the distortion is too great the base collapses away from beneath the tang so that it is no longer adequately supported in the forging process. The forging process typically produces a temperature of 430 degrees centigrade at the tang. Thermoplastics materials, which are most desirable for forming the commutator base, may withstand this temperature, but the combination of temperature and pressure distorts the base.

SUMMARY OF THE INVENTION

According to the present invention, there is provided an assembled commutator comprising a cylindrical base of thermoplastics material having a plurality of commutator segments mounted thereon, each segment having at an end thereof a tang for connection to an armature winding wire by a process involving heat, wherein an annular ring is provided on the base beneath the tangs, the ring being of high temperature non-softening material.

Preferably the ring is of phenolic, fibre-filled phenolic, or fibre material. Such materials may withstand temperatures higher than 500 degrees centigrade and will not soften, but rather will char at too high a temperature. The invention is particularly applicable to hot forging but also applicable to other techniques such as soldering the wire to the tangs.

Preferably the ring is held in place by fingers on the segment end which grip the ring.

Preferably the ring has a resistive coating and is in electrical contact with the segments so as to form a suppression element.

Another aspect of the invention provides an assembled commutator comprising a cylindrical base and a plurality of commutator segments mounted on the base, the segments each having a brush contacting portion having a tang at one end thereof for connection to an armature winding wire, wherein a suppression element is mounted on the base in the region of the tangs and makes electrical contact with the underside of each segment.

BRIEF DESCRIPTION OF THE DRAWINGS

The accompanying single FIGURE of drawing is a side view in partial cross-section of an assembled commutator forming an embodiment of the invention.

DESCRIPTION OF THE PREFERRED EMBODIMENTS

Referring to the drawing, an assembled commutator 1 comprises a cylindrical base 2 of thermoplastics having a main segment supporting part 3, a collar 4 and a spacer part 5 at a rear end which is arranged to abut a lamination stack of an armature. A plurality of commutator segments 6 (five in the example shown) are mounted on the base 2. Each segment 6 has a brush contacting part 7 with a finger at one end which locks into a recess 8 in the front end of the base 2, and a tang 9 at other end. Tangs 9 extend radially out from the brush contacting parts 7, 12 and have apertures 10 which fit over projections 11 on the front face of the collar 4 to hold that end of the segment against the base. The brush contacting part 7 may be glued to the base. The tangs 9 end in a U-shape 13 which rests on the collar 4. A shelf 14 is formed in the rear of the collar 12. A ring 15 of phenolic material or other high temperature, non-softening material such as fibre or fibre-filled phenolic is fitted on the shelf 14 beneath the U-shape parts 13. Fingers 16 on the tangs 9 extend to either side of the U-shape parts 13 and are bent over to hold the ring 15 in place, and also help hold the segments against axial movement on the base 2.

When forging a wire to a tang 9, the wire is looped into the U-shape part 13. A first electrode bears down on the U-shape part to collapse it onto the wire and a second electrode bears onto a wing 17 to one side. The phenolic ring 15 will withstand the heat generated and the pressure of the first electrode without softening or collapsing.

The invention is also of advantage when the wire is soldered to the tang.

As shown in dotted outline, a resistor or varistor ring 18, or other suppression element may be positioned on a second shelf 19 inside the ring 15 and the fingers 16 extended down to make electrical contact with the ring. In another embodiment, the suppression element may be positioned beside the phenolic ring to make electrical contact with the underside of the tangs or fingers. In another embodiment the ring 15 has a coating of resistive material which electrically connects the fingers 16 of adjacent segments.

The shelf 14 need not be continuous but may, for example, be formed on buttresses at the rear of the collar 4.

Various modifications may be made to the described embodiments and it is desired to include all such modifications and functional equivalents as fall within the scope of the accompanying claims.

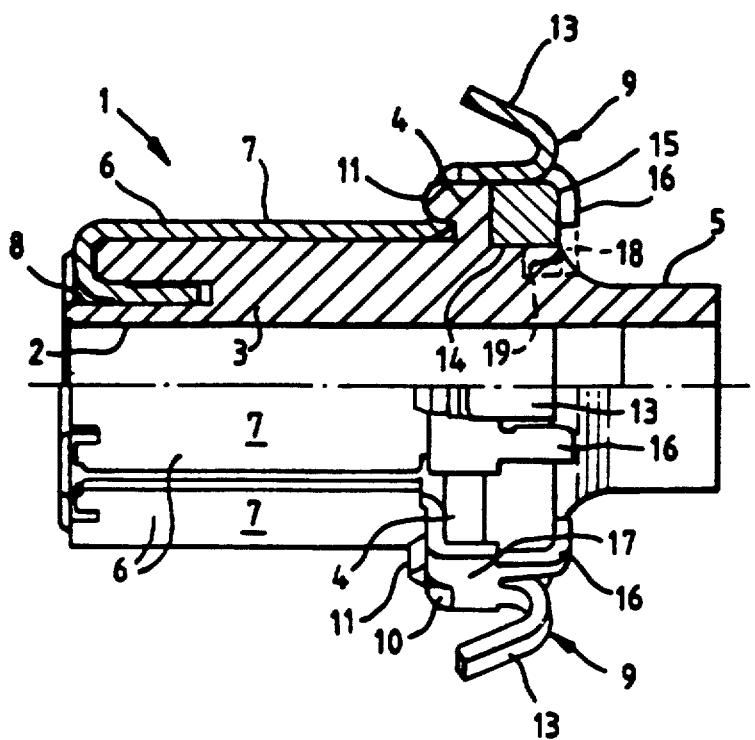

What is claimed is:

1. An assembled commutator comprising a cylindrical thermoplastic base having a first end and a second end, recesses formed in the first end, the base being formed with an integral outwardly projecting peripheral collar surrounding the base adjacent the second end, the base further having a supporting part extending between the first end and the collar, and the collar being formed with an annular shelf facing the second end of the base; an annular ring of high temperature non-softening material positioned on the shelf, the collar and the ring having adjacent peripheral surfaces; and a plurality of elongate commutator segments mounted on and around the base against the supporting part, each segment having a first finger at one end of the segment which fits into a respective one of the recesses and a tang and a second finger at an opposite end of the segment, the tang fitting over the peripheral surfaces of the collar and the ring, and the second finger extending over and against a rear surface of the ring which faces the second end of the base to hold the ring in position and prevent axial movement of the segment along the base towards the second end.

2. An assembled commutator according to claim 1, in which the collar is integrally formed with projections facing the first end of the base and the segments have apertures which fit over respective ones of the projections to hold the segments against the supporting part of the base adjacent the collar.

3. An assembled commutator according to claim 1, in which the base is integrally formed with a second annular shelf under the first shelf and a suppression ring is positioned on the second shelf.

4. An assembled commutator comprising a cylindrical thermoplastic base having a first end and a second end, the base being integrally formed with an outwardly projecting peripheral collar surrounding the base adjacent the second end, the base further having a supporting part extending between the first end and the collar, the collar being formed with an annular shelf facing the second end of the base; an annular ring of high temperature non-softening material on the shelf, the collar and the ring having adjacent peripheral surfaces; and a plurality of elongate commutator segments mounted on and around the base against the supporting part, each segment having a tang and a finger, the tang fitting over the peripheral surfaces of the collar and the ring, and the finger extending over and against a rear surface of the ring which faces the second end of the base to hold the ring in position and to prevent axial movement of the segment along the base towards the second end.

* * * * *

UNITED STATES PATENT AND TRADEMARK OFFICE
CERTIFICATE OF CORRECTION

PATENT NO. : 5,008,577                                  Page 1 of 2
DATED      : April 16, 1991
INVENTOR(S): Patrick S. WANG It is certified that error appears in the above-identified patent and that said Letters Patent is hereby corrected as shown below:

Claim 1, column 2, line 66, delete "second" insert --first--.
Claim 4, column 4, line 13, delete "second" insert --first--.

In the drawing
Fig. 1 should be deleted to appear as shown on attached sheet.

Signed and Sealed this

Twenty-fifth Day of January, 1994

Attest:

BRUCE LEHMAN

Attesting Officer                    Commissioner of Patents and Trademarks